United States Patent
Kito

(10) Patent No.: US 10,393,166 B2
(45) Date of Patent: Aug. 27, 2019

(54) SET SCREW, FIXING STRUCTURE, FIXING METHOD AND SEALING STRUCTURE

(71) Applicant: EagleBurgmann Japan Co., Ltd., Tokyo (JP)

(72) Inventor: Masakazu Kito, Tokyo (JP)

(73) Assignee: EagleBurgmann Japan Co., Ltd., Tokyo (JP)

( * ) Notice: Subject to any disclaimer, the term of this patent is extended or adjusted under 35 U.S.C. 154(b) by 352 days.

(21) Appl. No.: 15/128,318

(22) PCT Filed: Mar. 27, 2015

(86) PCT No.: PCT/JP2015/059581
§ 371 (c)(1),
(2) Date: Sep. 22, 2016

(87) PCT Pub. No.: WO2015/147252
PCT Pub. Date: Oct. 1, 2015

(65) Prior Publication Data
US 2017/0122358 A1    May 4, 2017

(30) Foreign Application Priority Data

Mar. 27, 2014 (JP) .................. 2014-066687

(51) Int. Cl.
*F16B 35/06* (2006.01)
*F16B 35/00* (2006.01)
(Continued)

(52) U.S. Cl.
CPC .............. *F16B 35/005* (2013.01); *F16B 5/02* (2013.01); *F16B 7/18* (2013.01); *F16B 41/002* (2013.01);
(Continued)

(58) Field of Classification Search
USPC .......................................... 411/399, 402–406
See application file for complete search history.

(56) References Cited

U.S. PATENT DOCUMENTS 2,462,910 A * 3/1949 Simmons ............ E21C 35/1936
403/362
2,574,677 A * 11/1951 Wieland ................ F16B 35/005
411/393
(Continued)

FOREIGN PATENT DOCUMENTS

| CN | 1674831 A | 9/2005 |
| DE | 20212600 U1 | 7/2003 |

(Continued)

OTHER PUBLICATIONS

Chinese Office Action dated May 2, 2017.
Extended European Search Report dated Oct. 25, 2017 (corresponding to European Application No. 15770131.9).

*Primary Examiner* — Gary W Estremsky
(74) *Attorney, Agent, or Firm* — Harness, Dickey & Pierce, P.L.C.

(57) ABSTRACT

Provided are a set screw, a fixing structure, a fixing method and a sealing structure that can reduce an exposed amount of a set screw and prevent the set screw from coming off a female thread. A fixing structure for fixing a first member 20 in which a female thread 21 is formed and a second member 30 which is provided to be slidable with respect to the first member 20, and in which a through-hole 31 is formed that has a diameter smaller than an inner diameter of the female thread 21, wherein the second member 30 is positioned with respect to the first member 20 in a state in which center axes of the female thread 21 and the through-hole 31 coincide with each other, the set screw 10 is engaged in the female thread 21, and the small diameter portion 13 is inserted into (Continued)

the through-hole 31, whereby the first member 20 and the second member 30 are fixed to each other.

3 Claims, 6 Drawing Sheets

(51) Int. Cl.
*F16B 5/02* (2006.01)
*F16B 7/18* (2006.01)
*F16J 15/34* (2006.01)
*F16B 41/00* (2006.01)

(52) U.S. Cl.
CPC ....... *F16J 15/3404* (2013.01); *F16J 15/3464* (2013.01); *F16J 15/3484* (2013.01); *F16B 7/182* (2013.01)

(56) References Cited

U.S. PATENT DOCUMENTS

| | | | | |
|---|---|---|---|---|
| 2,850,304 A * | 9/1958 | Wagner | ...................... | E04G 7/20 256/65.15 |
| 3,484,830 A * | 12/1969 | Wagner | ................. | F16B 7/0413 285/397 |
| 3,929,023 A * | 12/1975 | Ambruoso, Sr. | ...... | F16B 35/005 74/10.85 |
| 4,570,408 A * | 2/1986 | Frascaroli | ............. | E04B 1/5831 403/176 |
| 5,666,724 A * | 9/1997 | Kolsun | .................... | B23P 19/10 29/23.51 |
| 5,713,576 A | 2/1998 | Wasser et al. | | |
| 6,099,569 A * | 8/2000 | Keller | .................. | A61F 2/30721 623/20.15 |
| 6,213,740 B1 * | 4/2001 | Barnes | .................. | F01C 21/108 418/153 |
| 7,217,057 B2 * | 5/2007 | Keller | .................... | A61B 17/00 403/109.1 |
| 10,082,167 B2 * | 9/2018 | Peverada | .................. | F16B 2/04 |
| 2005/0141985 A1 | 6/2005 | Keller | | |
| 2007/0206989 A1 * | 9/2007 | Wagner | ............... | E04F 11/1836 403/297 |
| 2016/0160897 A1 * | 6/2016 | Allen | .................... | F16B 7/0413 403/362 |

FOREIGN PATENT DOCUMENTS

| | | |
|---|---|---|
| JP | S38-007168 B1 | 5/1963 |
| JP | S44-005781 Y1 | 3/1969 |
| JP | 2002-098237 A | 4/2002 |
| JP | 2005-535421 A | 11/2005 |
| WO | 2009/047507 A1 | 4/2009 |

* cited by examiner

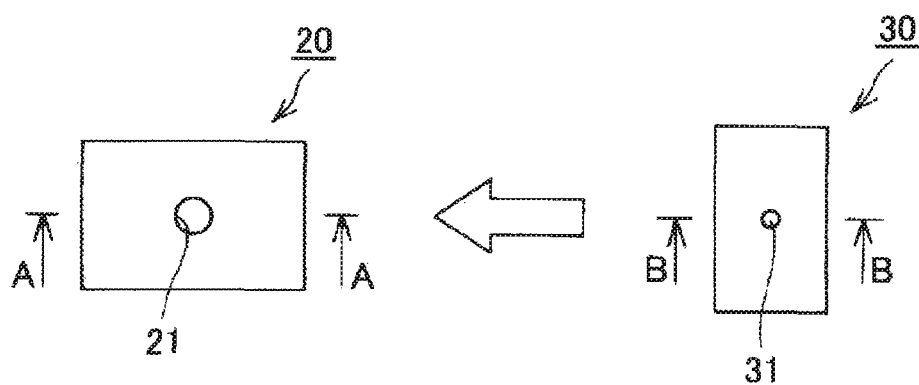
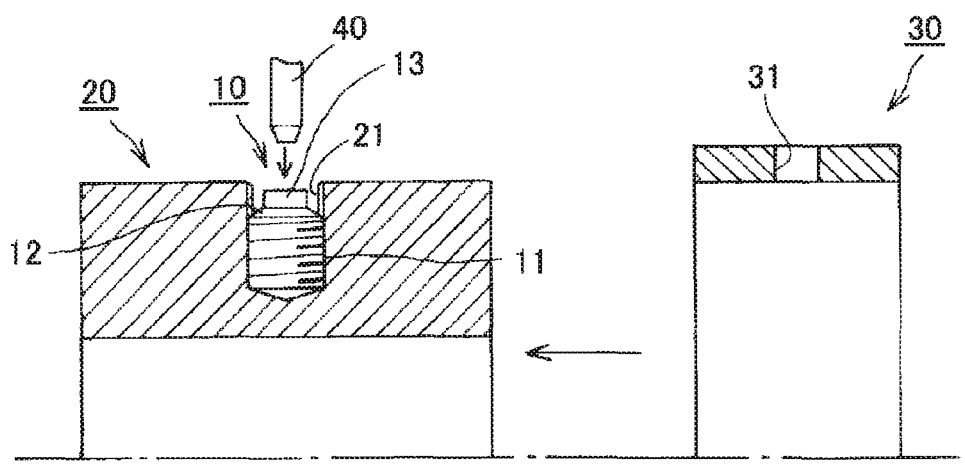
Fig. 4
Fig. 5

SET SCREW, FIXING STRUCTURE, FIXING METHOD AND SEALING STRUCTURE

CROSS-REFERENCE TO RELATED APPLICATIONS

This application is a National Stage of International Application No. PCT/JP2015/059581, filed Mar. 27, 2015 (now WO/2015/147252), which claims priority to Japanese Application No. 2014-066687, filed Mar. 27, 2014. The entire disclosures of each of the above applications are incorporated herein by reference.

FIELD

The present disclosure relates to a set screw, a fixing structure, a fixing method and a sealing structure.

BACKGROUND

A set screw has been widely used as a fastener for fixing or fastening two members to each other. When the two members are fixed to each other with the set screw, in general, a positioning hole is formed in one member and a female thread is formed in the other member. In a state in which center axes of the female thread and the positioning hole coincide with each other, the two members are positioned and the set screw is screwed into the female thread from a female thread side to a position where a distal end of the set screw enters the positioning hole, thereby the two members are fixed to each other. Commonly, a female thread is formed on a member having a wider space so as not to hinder fastening work by a fastening tool. For example, when two cylindrical members are fixed, a female thread is formed in a member on a radially outer side. A general fixing method in fixing the two cylindrical members in this way is described with reference to FIG. 11.

FIG. 11 is a schematic sectional view showing a fixing structure with a set screw according to a conventional example. In the example shown in the figure, a cylindrical first member 610 and a cylindrical second member 620 are fixed to each other with a set screw 700. A positioning hole 611 is formed in an outer circumferential surface side of the first member 610. A female thread 621 is formed in the second member 620. When the first member 610 and the second member 620 configured as described above are fixed, first, the second member 620 is made to slide with respect to the first member 610 to match the center axes of the female thread 621 and the positioning hole 611. In this state, the set screw 700 is screwed into the female thread 621 to a position where a distal end of the set screw 700 enters the positioning hole 611. Consequently, the second member 620 becomes unable to move in both an axial direction (a direction of the center axis of the first member 610 and the second member 620) and a rotating direction with respect to the first member 610. Therefore, the first member 610 and the second member 620 are fixed to each other.

However, in the case of such a fixing structure, the female thread 621 has to be formed in the second member 620 provided on the radially outer side. The inner diameter of the female thread 621 has to be set according to the dimension of the set screw 700; hence, commonly, a shaft portion side of the set screw 700 is in an exposed state. Consequently, in some cases, not only its appearance but also its function may be adversely affected.

For example, in a sealing structure including a mechanical seal, there is known a technique for, in order to cause a fluid to flow, fixing an annular partial impeller on the outer circumference of a sleeve attached to a rotating shaft (see Patent Literature 1). In this technique, the partial impeller is fixed to the sleeve with a set screw. A plurality of grooves are formed on the outer circumferential surface of the partial impeller in order to cause fluid to flow according to the rotation of the partial impeller. Therefore, in order to fix the set screw from the outer circumference surface side of the partial impeller, a female thread has to be formed in a position between the grooves, or in the groove. Therefore, in some cases, the grooves may be joined by the female thread depending on the dimension of the inner diameter of the female thread. In some cases, a part of a shaft portion of the set screw projects into the grooves and a part of the grooves is closed by the shaft portion. In these cases, the ability of the partial impeller to cause the fluid to flow is deteriorated.

In the structure shown in FIG. 11, in a case when the first member 610 and the second member 620 rotate, there is also a problem in that, if the set screw 700 loosens, the set screw 700 gradually comes off the female thread 621 due to a centrifugal force. The sealing structure described above also has this problem.

CITATION LIST

Patent Literature

Patent Literature 1, Japanese Patent Application Laid-Open No. 2002-98237

SUMMARY

Technical Problem

It is an object of the present disclosure to provide a set screw, a fixing structure, a fixing method and a sealing structure that can reduce an exposed amount of a set screw and prevent the set screw from coming off a female thread.

Solution to Problem

The present disclosure adopts means described below in order to solve the problems.

That is, a set screw of the present disclosure includes, a shaft portion comprising a male thread, and a small diameter portion provided on a rear end side of the shaft portion and having a diameter smaller than an outer diameter of the male thread, wherein an engagement portion to which a fastening tool is to be engaged is provided on the small diameter portion.

According to the present disclosure, a portion (the small diameter portion) provided with the engagement portion, in which the fastening tool is to be engaged, is configured to have a diameter smaller than the outer diameter of the male thread in the shaft portion. A female thread is formed in one member of two members fixed with the set screw. A through-hole, on the inner side of which the small diameter portion is inserted, is formed in another member. As described above, the small diameter portion has a diameter smaller than the outer diameter of the male thread in the shaft portion. The inner diameter of the through-hole can be set to be small irrespective of the dimension of the male thread. Since the engagement portion is provided in the small diameter portion inserted into the through-hole, the set screw is exposed from the through-hole. However, as described above, since the through-hole can be formed small in diameter, it is possible to reduce the exposed amount of the set screw. Further, since the through-hole can be formed smaller than the inner diameter of the female thread, even if a force acts on the set screw in a direction in which the set screw comes off the female thread, it is possible to prevent the set screw from coming off the female thread by the means of the member in which the through-hole is provided.

It is preferable that a tapered portion that reduces in diameter from the shaft portion to the small diameter portion is provided between the shaft portion and the small diameter portion.

Consequently, the tapered portion comes into contact with an opening portion of the through-hole formed in the other member, hence, it is possible to improve positioning accuracy of the one member and the other member.

A fixing structure of the present disclosure is a fixing structure for fixing a first member in which a female thread is formed and a second member which is provided to be slidable with respect to the first member, and in which a through-hole is formed that has a diameter smaller than an inner diameter of the female thread, wherein the second member is positioned with respect to the first member in a state in which center axes of the female thread and the through-hole coincide with each other, the male thread of the above described set screw is engaged in the female thread, and the small diameter portion is inserted into the through-hole, whereby the first member and the second member are fixed to each other.

With this fixing structure, as described above, it is possible to reduce the exposed amount of the set screw and prevent the set screw from coming off the female thread.

A fixing method of the present disclosure is a fixing method for fixing a first member in which a female thread is formed and a second member which is provided to be slidable with respect to the first member, and in which a through-hole is formed having a diameter smaller than an inner diameter of the female thread, wherein the fixing method including, a first step of screwing the above described set screw into the female thread until an end portion of the small diameter portion is positioned on an inner side of a surface of the first member, a second step of sliding the second member with respect to the first member to a position where a center axis of the through-hole and a center axis of the female thread coincide with each other, after the first step, and a third step of moving the set screw until the small diameter portion of the set screw is inserted into the through-hole formed in the second member by rotating the set screw in a direction opposite to a screwing direction, after the second step.

Consequently, even if the diameter of the through-hole formed in the second member is smaller than the inner diameter of the female thread formed in the first member, the first member and the second member can be fixed to each other with the set screw.

A sealing structure of the present disclosure is a sealing structure in which an annular partial impeller for causing a fluid to flow is mounted on an outer circumference of a sleeve attached to a rotating shaft, in a sealed region sealed by a mechanical seal, wherein a female thread is formed in the sleeve, and a through-hole having a diameter smaller than an inner diameter of the female thread is formed in the partial impeller, and the partial impeller is positioned with respect to the sleeve in a state in which center axes of the female thread and the through-hole coincide with each other, the male thread of the above described set screw is engaged in the female thread, and the small diameter portion is inserted into the through-hole, whereby the sleeve and the partial impeller are fixed to each other.

Consequently, it is possible to set the diameter of the through-hole formed in the partial impeller smaller than the inner diameter of the female thread formed in the sleeve, and thereby reduce the exposed amount of the set screw. Therefore, it is possible to suppress deterioration in the ability of the partial impeller to cause the fluid to flow. Further, although a centrifugal force acts on the set screw, the set screw is prevented from coming off the female thread because the set screw abuts against the partial impeller.

Note that the configurations described above can be adopted in combination as much as possible.

Advantageous Effects of Invention

As described above, according to the present disclosure, it is possible to reduce the exposed amount of the set screw, and it is possible to prevent the set screw from coming off the female thread.

DRAWINGS

FIG. 4 is a schematic diagram showing an example of two members fixed with the set screw according to the example of the present disclosure.

FIG. 5 is a diagram showing a process of a fixing method according to the example of the present disclosure.

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

EXAMPLE

<Set Screw>

Figure 1:
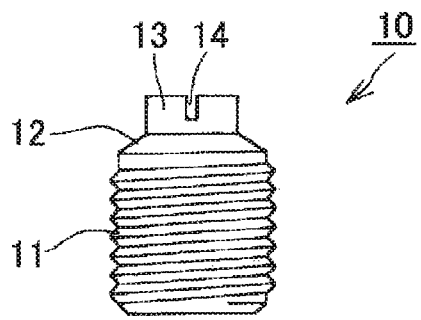
FIG. 1 is a front view of a set screw according to an example of the present disclosure.
Figure 2:
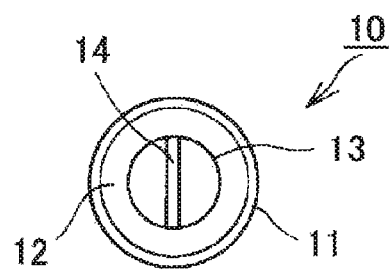
FIG. 2 is a plan view of the set screw according to the example of the present disclosure.
Figure 3:
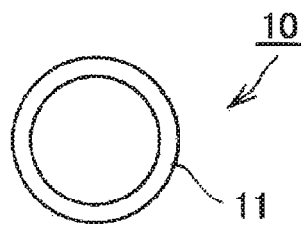
FIG. 3 is a bottom view of the set screw according to the example of the present disclosure.

A set screw according to an example of the present disclosure is described in detail with reference to FIGS. 1 to 3. FIG. 1 is a front view of the set screw according to the example of the present disclosure. FIG. 2 is a plan view of the set screw according to the example of the present disclosure and is equivalent to a view of the set screw viewed from an upward direction in FIG. 1. FIG. 3 is a bottom view of the set screw according to the example of the present disclosure and is equivalent to a view of the set screw viewed from a downward direction in FIG. 1.

A set screw 10 according to this example includes a shaft portion 11 including a male thread, a small diameter portion 13 provided on a rear end side of the shaft portion 11, and a tapered portion 12 provided between the shaft portion 11 and the small diameter portion 13 and reduces in diameter from the shaft portion 11 toward the small diameter portion 13. The outer diameter of the small diameter portion 13 is smaller than the outer diameter of the male thread in the shaft portion 11. In the small diameter portion 13, a slotting 14 functioning as an engagement portion, to which a fastening tool is to be engaged, is provided in the small diameter portion 13. Note that, in this example, the slotting is described as the engagement portion. However, the engagement portion in the present disclosure is not limited to the slotting. Various publicly-known techniques such as a cross hole, a hexagonal hole, and a square hole can be applied.

<Fixing Method and Fixing Structure>

A fixing method and a fixing structure using the set screw 10 are described with reference to FIGS. 4 to 7. An example is described in which two cylindrical members are fixed to each other with the set screw 10. Note that FIG. 4 is a schematic diagram showing an example of two members fixed with the set screw 10 according to the example of the present disclosure. One member of the two members is referred to as first member 20 and another member is referred to as second member 30. A female thread 21 is formed in the first member 20. A through-hole 31 having a diameter smaller than the inner diameter of the female thread 21 is formed in the second member 30. The inner diameter of the cylindrical second member 30 is designed to be slightly larger than the outer diameter of the cylindrical first member 20. Consequently, the second member 30 is capable of sliding in an axial direction (a direction of the center axes of the first member 20 and the second member 30) and a rotating direction with respect to the first member 20.

Figure 6:
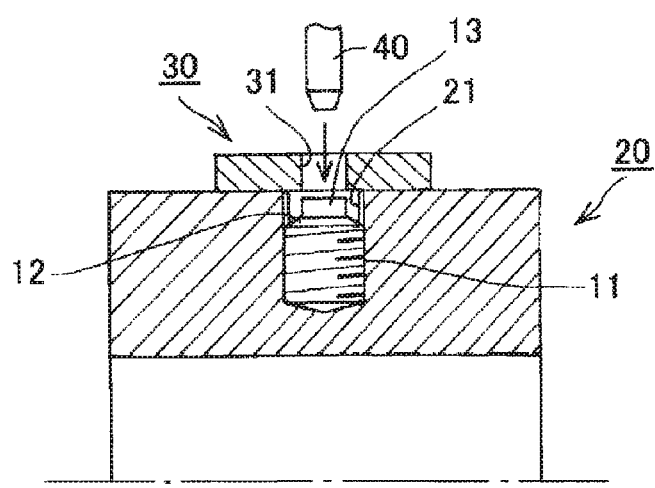
FIG. 6 is a diagram showing a process of the fixing method according to the example of the present disclosure.
Figure 7:
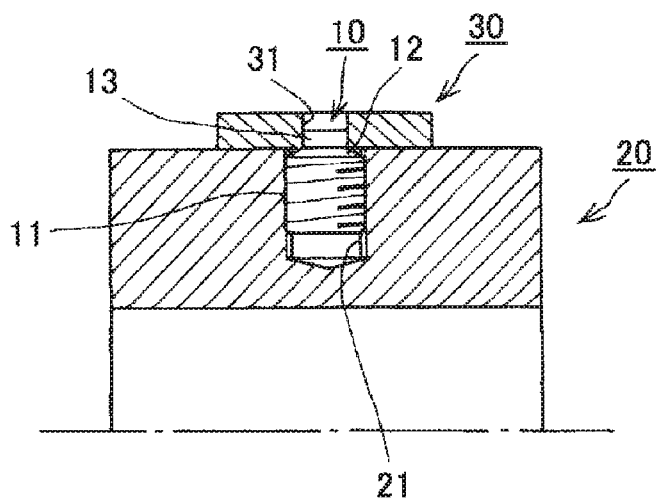
FIG. 7 is a schematic sectional view showing a fixing structure according to the example of the present disclosure.

A method of fixing the first member 20 and the second member 30 configured as described above using the set screw 10 is described with reference to FIGS. 5 to 7. Note that, in FIGS. 5 to 7, the first member 20 is equivalent to an AA sectional view in FIG. 4 and the second member 30 is equivalent to a BB sectional view in FIG. 4. However, in FIGS. 5 to 7, only upper halves of the sectional views are shown.

First, as shown in FIG. 5, the set screw 10 is screwed into the female thread 21 by a fastening tool (here, a straight screwdriver) 40 until an end portion of the small diameter portion 13 is positioned on an inner side of the surface (the outer circumferential surface) of the first member 20 (a first step). After the first step, as shown in FIG. 6, the second member 30 is made to slide with respect to the first member 20 to a position where a center axis of the through-hole 31 and a center axis of the female thread 21 coincide with each other (a second step). After the second step, as shown in FIG. 7, the set screw 10 is rotated in a direction opposite to the screwing direction by the fastening tool 40 to move the set screw 10 until the small diameter portion 13 in the set screw 10 is inserted into the through-hole 31 formed in the second member 30 (a third step).

According to the fixing method described above, the first member 20 and the second member 30 can be fixed to each other with the set screw 10. That is, the second member 30 is positioned with respect to the first member 20 in a state in which the center axes of the female thread 21 and the through-hole 31 coincide with each other, the male thread of the set screw 10 is fit in the female thread 21, and the small diameter portion 13 is inserted into the through-hole 31, whereby the first member 20 and the second member 30 are fixed to each other. Note that the second member 30 becomes unable to move in both an axial direction and a rotating direction with the set screw 10. Therefore, the first member 20 and the second member 30 are fixed to each other.

In this example, the two cylindrical members are fixed with the set screw 10. However, the two members that can be fixed with the set screw 10 according to this example are not limited to the cylindrical members. Even if a cross section is not circular, in a case of two cylindrical members capable of sliding with respect to each other, the two members can be fixed, theoretically, by one set screw 10. Even if the two members are flat members rather than cylindrical members, provided that the two members are configured to be capable of sliding only in a linear direction, the two flat members can be fixed, theoretically, by one set screw 10. Further, if the two flat members are configured to be capable of sliding only in a surface direction, provided that the two flat members are fixed in two places by two set screws 10, the two flat members can be fixed theoretically. As described thus far, a wide variety of two members can be fixed to each other with the set screw 10 according to this example.

<Advantageous Points of the Set Screw, the Fixing Method and the Fixing Structure Using the Set Screw According to the Present Example>

In the set screw 10 according to the present example, the portion (the small diameter portion 13) provided with the engagement portion (the slotting 14), to which the fastening tool 40 is to be engaged, is configured to have a diameter smaller than the outer diameter of the male thread in the shaft portion 11. The female thread 21 is formed in the first member 20 fixed with the set screw 10. The through-hole 31, into the inner side thereof the small diameter portion 13 is inserted, is formed in the second member 30. The small diameter portion 13 has a diameter smaller than the outer diameter of the male thread in the shaft portion 11. The inner diameter of the through-hole 31 can be set to be small irrespective of the dimension of the male thread. Since the engagement portion (the slotting 14) is provided in the small diameter portion 13 inserted into the through-hole 31, the set screw 10 is exposed from the through-hole 31. However, as described above, since the through-hole 31 can be reduced in diameter, it is possible to reduce the exposed amount of the set screw 10. Further, since the through-hole 31 can be set to be smaller than the inner diameter of the female thread 21, even if a force acts on the set screw 10 in a direction in which the set screw 10 comes off the female thread 21, it is possible to prevent, with the second member 30 in which the through-hole 31 is provided, the set screw 10 from coming off the female thread 21.

In the set screw 10 according to this example, the tapered portion 12 that reduces in diameter from the shaft portion 11 toward the small diameter portion 13 is provided between the shaft portion 11 and the small diameter portion 13. Consequently, the tapered portion 12 comes into contact with an opening portion of the through-hole 31 formed in the second member 30. Therefore, it is possible to improve positioning accuracy of the first member 20 and the second member 30.

By adopting the fixing method described above, even if the diameter of the through-hole 31 formed in the second member 30 is smaller than the inner diameter of the female thread 21 formed in the first member 20, the first member 20 and the second member 30 can be fixed to each other with the set screw 10.

Application Example 1

Applied to a Sealing Structure

Figure 8:
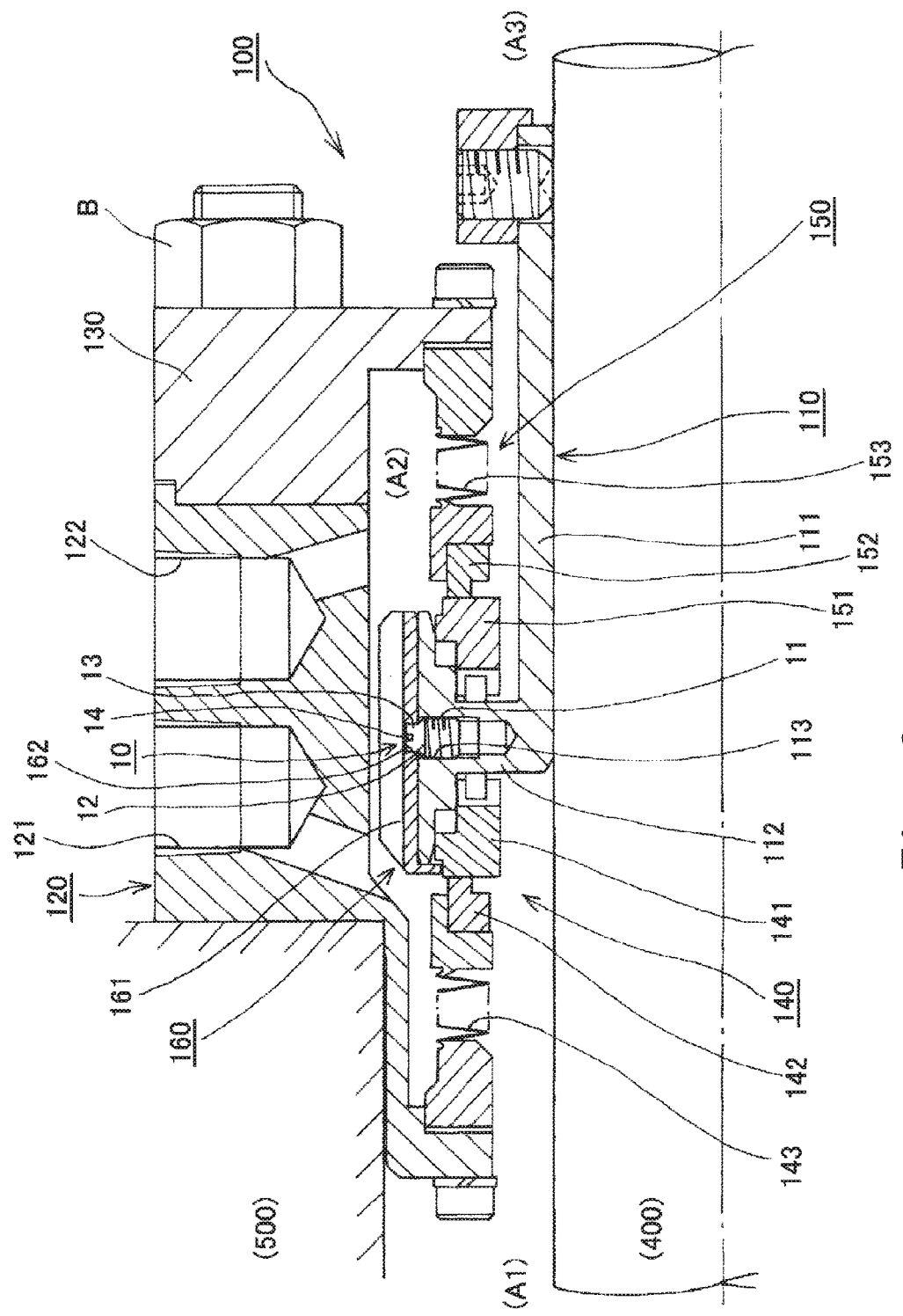
FIG. 8 is a schematic sectional view showing an example in which the fixing structure according to the example of the present disclosure is applied to a sealing structure.
Figure 9:
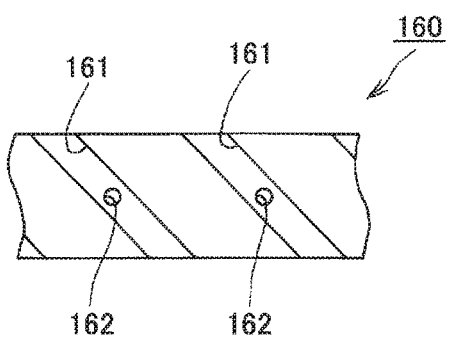
FIG. 9 is an external view of a partial impeller in the example in which the fixing structure according to the example of the present disclosure is applied to the sealing structure.

With reference to FIGS. 8 and 9, an example is described in which the fixing method and the fixing structure using the set screw 10 are applied to a sealing structure. FIG. 8 is a schematic sectional view showing an example in which the fixing structure according to the example of the present disclosure is applied to a sealing structure. FIG. 9 is an external view of a partial impeller in the example in which the fixing structure according to the example of the present disclosure is applied to the sealing structure. Note that, in this application example 1, the fixing structure described above is applied to a sealing structure in which an annular partial impeller for causing a fluid to flow is mounted on an outer circumference of a sleeve attached to a rotating shaft, in a sealed region sealed by a mechanical seal.

A sealing structure 100 according to this application example plays a role of sealing an annular gap between a rotating shaft 400 and a shaft hole provided in an apparatus main body 500. The sealing structure 100 includes a sleeve 110 attached to the rotating shaft 400, a first housing 120 and a second housing 130 fixed to the apparatus main body 500, and a first mechanical seal 140 and a second mechanical seal 150.

The sleeve 110 includes a cylindrical portion 111 mounted on the outer circumference of the rotating shaft 400 and a projecting portion 112 projecting to an radially outer side at an end portion of the cylindrical portion 111. In the first housing 120, a supply port 121 to which a fluid is supplied and a discharge port 122 from which the fluid is discharged are provided. The first housing 120 and the second housing 130 are fixed to the apparatus main body 500 by a bolt B. The first mechanical seal 140 includes a rotating ring 141 provided on a sleeve 110 side, a stationary ring 142 provided on an apparatus main body 500 side, and a metal bellows 143 that presses the stationary ring 142 to a rotating ring 141 side. Similarly, the second mechanical seal 150 includes a rotating ring 151 provided on the sleeve 110 side, a fixed ring 152 provided on the apparatus main body 500 side, and a metal bellows 153 that presses the fixed ring 152 to the rotating ring 151 side.

A second sealed region (A2) is formed between a first sealed region (A1) in an inside of the apparatus main body 500 and an atmosphere side region (A3) by the sealing structure 100 configured as described above. In the second sealed region (A2), by feeding the fluid from the supply port 121 to the discharge port 122, it is possible to more reliably suppress the sealed fluid in the first sealed region (A1) from leaking out to the atmosphere side region (A3). In addition, in the second sealed region (A2), in order to allow the fluid to flow from the supply port 121 to the discharge port 122, an annular partial impeller 160 is provided. That is, the partial impeller 160 is attached to an outer circumference of the projecting portion 112 of the sleeve 110. A plurality of grooves 161 are formed on an outer circumferential surface of the partial impeller 160. Consequently, since the partial impeller 160 rotates together with the rotating shaft 400, it is possible to cause the fluid in the second sealed region (A2) to flow from the left side to the right side in FIG. 8.

In the application example 1, the sleeve 110 corresponds to the first member 20 in the fixing structure and the partial impeller 160 corresponds to the second member 30 in the fixing structure. That is, a female thread 113 is formed in the projecting section 112 of the sleeve 110, and through-holes 162 having a diameter smaller than the inner diameter of the female thread 113 are formed in the partial impeller 160. The partial impeller 160 is positioned with respect to the sleeve 110 in a state in which center axes of the female thread 113 and the through-holes 162 coincide with each other, the male thread of the set screw 10 is fit in the female thread 113, and the small diameter portion 13 is inserted into the through-hole 162, whereby the sleeve 110 and the partial impeller 160 are fixed to each other. Note that a method of fixing the sleeve 110 and the partial impeller 160 using the set screw 10 is the same as the method of fixing the first member 20 and the second member 30 using the set screw 10, hence, a description of the method is omitted.

With the sealing structure 100 configured as described above, it is possible to set the diameter of the through-holes 162 formed in the partial impeller 160 smaller than the inner diameter of the female thread 113 formed in the sleeve 110 and reduce the exposed amount of the set screw 10. Therefore, it is possible to suppress deterioration in an ability of the partial impeller 160 to cause the fluid to flow. Further, although a centrifugal force acts on the set screw 10, the set screw 10 is prevented from coming off the female thread 113 because the set screw 10 abuts against the partial impeller 160.

Application Example 2

Applied to the Sealing Structure

Figure 10:
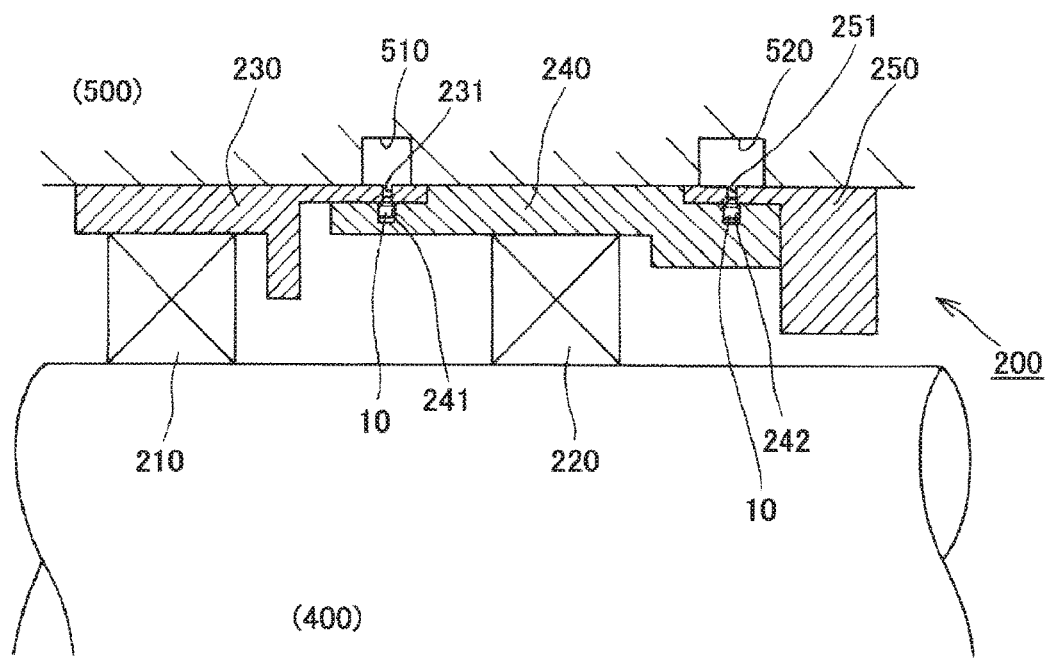
FIG. 10 is a schematic sectional view showing an example in which the fixing structure according to the example of the present disclosure is applied to a sealing structure.
Figure 11:
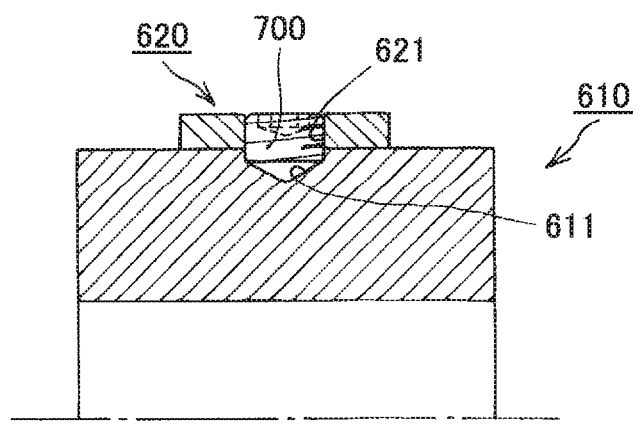
FIG. 11 is a schematic sectional view showing a fixing structure with a set screw according to a conventional example.

With reference to FIG. 10, an example is described in which the fixing method and the fixing structure using the set screw 10 are applied to a sealing structure. FIG. 10 is a schematic sectional view showing an example in which the fixing structure according to the example of the present disclosure is applied to a sealing structure. Note that, in the application example 2, the fixing structure described above is applied as a fixing structure for fixing a plurality of housings, in a sealing structure including a mechanical seal.

A sealing structure 200 according to this application example plays a role of sealing an annular gap between the rotating shaft 400 and the shaft hole provided in the apparatus main body 500. Note that, in this application example, a plurality of annular grooves 510 and 520 that function as a flow path of the fluid are formed on the inner circumferential surface of the shaft hole of the apparatus main body 500. The sealing structure 200 according to this application example includes a first mechanical seal 210, a second mechanical seal 220, a first housing 230, a second housing 240, and a third housing 250. Outer circumferential surfaces of the first housing 230, the second housing 240, and the third housing 250 are configured to fit in an inner circumferential surface of the shaft hole of the apparatus main body 500.

The fixing structure is used to fix the first housing 230 and the second housing 240. That is, a female thread 241 is formed in the second housing 240. A through-hole 231 having a diameter smaller than the inner diameter of the female thread 241 is formed in the first housing 230. The first housing 230 is positioned with respect to the second housing 240 in a state in which center axes of the female thread 241 and the through-hole 231 coincide with each other, the male thread of the set screw 10 is fit in the female thread 241, and the small diameter portion 13 is inserted into the through-hole 231, whereby the first housing 230 and the second housing 240 are fixed to each other.

The fixing structure is used to fix the second housing 240 and the third housing 250. That is, a female thread 242 is formed in the second housing 240. A through-hole 251 having a diameter smaller than the inner diameter of the female thread 242 is formed in the third housing 250. The third housing 250 is positioned with respect to the second housing 240 in a state in which center axes of the female thread 242 and the through-hole 251 coincide with each other, the male thread of the set screw 10 is fit in the female thread 242, and the small diameter portion 13 is inserted into the through-hole 251, whereby the second housing 240 and the third housing 250 are fixed to each other.

In the sealing structure 200 configured as described above, it is possible to set the diameter of the through-hole 231 formed in the first housing 230 and the diameter of the through-hole 251 formed in the third housing 250 smaller than the inner diameters of the female threads 241 and 242 formed in the second housing 240, respectively. Consequently, it is possible to reduce the exposed amount of the set screw 10. Since the set screw 10 abuts against the first housing 230 or the third housing 250, the set screw 10 is prevented from coming off the female threads 241 and 242. Consequently, when the first housing 230, the second housing 240, and the third housing 250 are detached from the apparatus main body 500, a trouble in that the set screw 10 is caught by the annular grooves 510 and 520 does not occur.

REFERENCE SIGNS LIST

10: set screw
11: shaft portion
12: tapered portion
13: small diameter portion
14: slotting
20: first member
21: female thread
30: second member
31: through-hole
40: fastening tool
100: sealing structure
110: sleeve
111: cylindrical portion
112: projecting portion
113: female thread
120: first housing
121: supply port
122: discharge port
130: second housing
140: first mechanical seal
141: rotating ring
142: stationary ring
143: metal bellows
150: second mechanical seal
151: rotating ring
152: stationary ring
153: metal bellows
160: partial impeller
161: groove
162: through-hole
200: sealing structure
210: first mechanical seal
220: second mechanical seal
230: first housing
231: through-hole
240: second housing
241, 242: female thread
250: third housing
251: through-hole
400: rotating shaft
500: apparatus main body
510, 520: annular groove

The invention claimed is:

1. A fixing structure for fixing a first member in which a female thread is formed and a second member which is provided to be slidable with respect to the first member, and in which a through-hole is formed that has a diameter smaller than an inner diameter of the female thread,
wherein the fixing structure has a set screw comprising:
a shaft portion comprising a male thread; and
a small diameter portion provided on a rear end side of the shaft portion and having a diameter smaller than an outer diameter of the male thread,
wherein an engagement portion to which a fastening tool is to be engaged is provided on the small diameter portion,
the second member is positioned with respect to the first member in a state in which center axes of the female thread and the through-hole coincide with each other, the male thread of the set screw is engaged in the female thread, and the small diameter portion is inserted into the through-hole, whereby the first member and the second member are fixed to each other, and
a tapered portion that reduces in diameter from the shaft portion to the small diameter portion is provided between the shaft portion and the small diameter portion.

2. A sealing structure in which an annular partial impeller for causing a fluid to flow is mounted on an outer circumference of a sleeve attached to a rotating shaft, in a sealed region sealed by a mechanical seal,
wherein a female thread is formed in the sleeve, and a through-hole having a diameter smaller than an inner diameter of the female thread is formed in the partial impeller,
the sealing structure has a set screw comprising:
a shaft portion comprising a male thread; and
a small diameter portion provided on a rear end side of the shaft portion and having a diameter smaller than an outer diameter of the male thread,
wherein an engagement portion to which a fastening tool is to be engaged is provided on the small diameter portion, and
the partial impeller is positioned with respect to the sleeve in a state in which center axes of the female thread and the through-hole coincide with each other, the male thread of the set screw is engaged in the female thread, and the small diameter portion is inserted into the through-hole, whereby the sleeve and the partial impeller are fixed to each other.

3. The sealing structure according to claim 2, wherein a tapered portion that reduces in diameter from the shaft portion to the small diameter portion is provided between the shaft portion and the small diameter portion.

* * * * *